United States Patent
Wagner et al.

(10) Patent No.: US 6,921,000 B2
(45) Date of Patent: Jul. 26, 2005

(54) PROCESS AND APPARATUS FOR DISPENSING FLUIDS

(75) Inventors: Joachim Wagner, Köln (DE); Peter Jähn, Leverkusen (DE); Jacqueline Kusan-Bindels, Neuss (DE); Dagmar Ulbrich, Köln (DE); Rolf Albach, Köln (DE); Hermann-Josef Kirschbaum, Kerpen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 205 days.

(21) Appl. No.: 10/307,819

(22) Filed: Dec. 2, 2002

(65) Prior Publication Data

US 2003/0121561 A1 Jul. 3, 2003

(30) Foreign Application Priority Data

Dec. 3, 2001 (DE) ........................................ 101 59 272

(51) Int. Cl.[7] .............................................. B67D 5/08
(52) U.S. Cl. .............................. 222/1; 222/56; 222/61; 222/77; 222/132; 222/135; 222/144.5; 222/145.1; 141/9
(58) Field of Search ..................... 366/150.1, 151.1, 366/152.1, 152.2, 153.1, 160.1, 167.1, 173.1; 141/9; 222/1, 30, 56, 57, 58, 61, 64, 132, 135, 144.5, 394, 399, 77, 145.1

(56) References Cited

U.S. PATENT DOCUMENTS

| 5,046,569 A | 9/1991 | von der Haar et al. ........ 177/50 |
| 5,375,634 A | 12/1994 | Egger .......................... 141/83 |
| 5,558,435 A | 9/1996 | Marjo ......................... 366/141 |
| 5,887,975 A | * 3/1999 | Mordaunt et al. ........ 366/152.1 |

FOREIGN PATENT DOCUMENTS

| DE | 32 10 523 | 10/1983 |
| DE | 34 19 485 | 11/1985 |
| DE | 44 19 415 | 12/1995 |
| DE | 196 54 829 | 6/1998 |
| EP | 0 870 960 | 10/1998 |
| GB | 1 403 624 | 8/1975 |
| WO | WO 99/47906 | * 9/1999 ............ G01N/1/00 |

* cited by examiner

*Primary Examiner*—Michael Mar
*Assistant Examiner*—Patrick Buechner
(74) *Attorney, Agent, or Firm*—Joseph C. Gil; Lyndanne M. Whalen

(57) ABSTRACT

This invention relates to an apparatus and a process for rapidly and accurately dispensing fluids, in which at least one component is dispensed into the reaction vessel in two or three stages. In this process, the amount of fluid dispensed in the second and third stages is determined on the basis of the mass flow rate calculated in the preceding sub-step.

5 Claims, 1 Drawing Sheet

PROCESS AND APPARATUS FOR DISPENSING FLUIDS

BACKGROUND OF THE INVENTION

This invention relates to a process for rapidly and accurately dispensing fluids and to an apparatus useful for performing this process.

In industrial practice, there are many applications in which, during the production of a product, two or more fluids of differing densities and of differing viscosities must be dispensed, wherein the quantities of the individual components vary over a wide range. Examples are the production of fragrances or flavors, colorant mixtures, adhesives etc. Another example is the production of a polyurethane reaction mixture on the laboratory scale. In complex systems, from 5 to 50 different components each having a viscosity which may vary from 0.1 to 400,000 mPa·s, must be dispensed in quantities which may vary over a wide range (e.g., from 0.001 to 1000 ml or from 0.001 to 1000 g).

In practice, the individual components are dispensed volumetrically.

In such applications, automatic pipettes/fluid handlers are used for very small quantities of relatively low viscosity substances, while lobe pumps or positive-displacement pumps (membrane, piston or gear pumps) with positive displacement pistons for batch displacement are used for larger quantities. While this principle generally functions satisfactorily for low viscosity fluids, high viscosity fluids, in particular those involving high viscosity, resinous components, cannot be dispensed using such methods. In the transitional range, i.e. in medium viscosity fluids, dispensing errors of greater than 5% readily occur. In particular, each component must have a dedicated dispensing pump, which increases equipment costs. Depending upon the quantity and viscosity of the individual components, dispensing pumps of differing sizes and powers, each having different functional characteristics (i.e. dispensing accuracy) must be used.

The use of mass flowmeters also presents major disadvantages because the large number of flowmeters required creates considerable complexity in controlling the dispensing process.

SUMMARY OF THE INVENTION

The object of the present invention is to provide a process and an apparatus with which two or more fluid components of a mixture may be dispensed rapidly, accurately and reproducibly, even if the individual fluids exhibit different densities and viscosities and the quantity of the individual components vary over a wide range.

This and other objects which will be apparent to those skilled in the art are accomplished by dispensing at least two fluids with the apparatus described in detail below.

BRIEF DESCRIPTION OF THE DRAWING

The FIGURE illustrates a dispensing apparatus within the scope of the present invention of the type which was used in Example 1.

DETAILED DESCRIPTION OF THE PRESENT INVENTION

Figure 1:
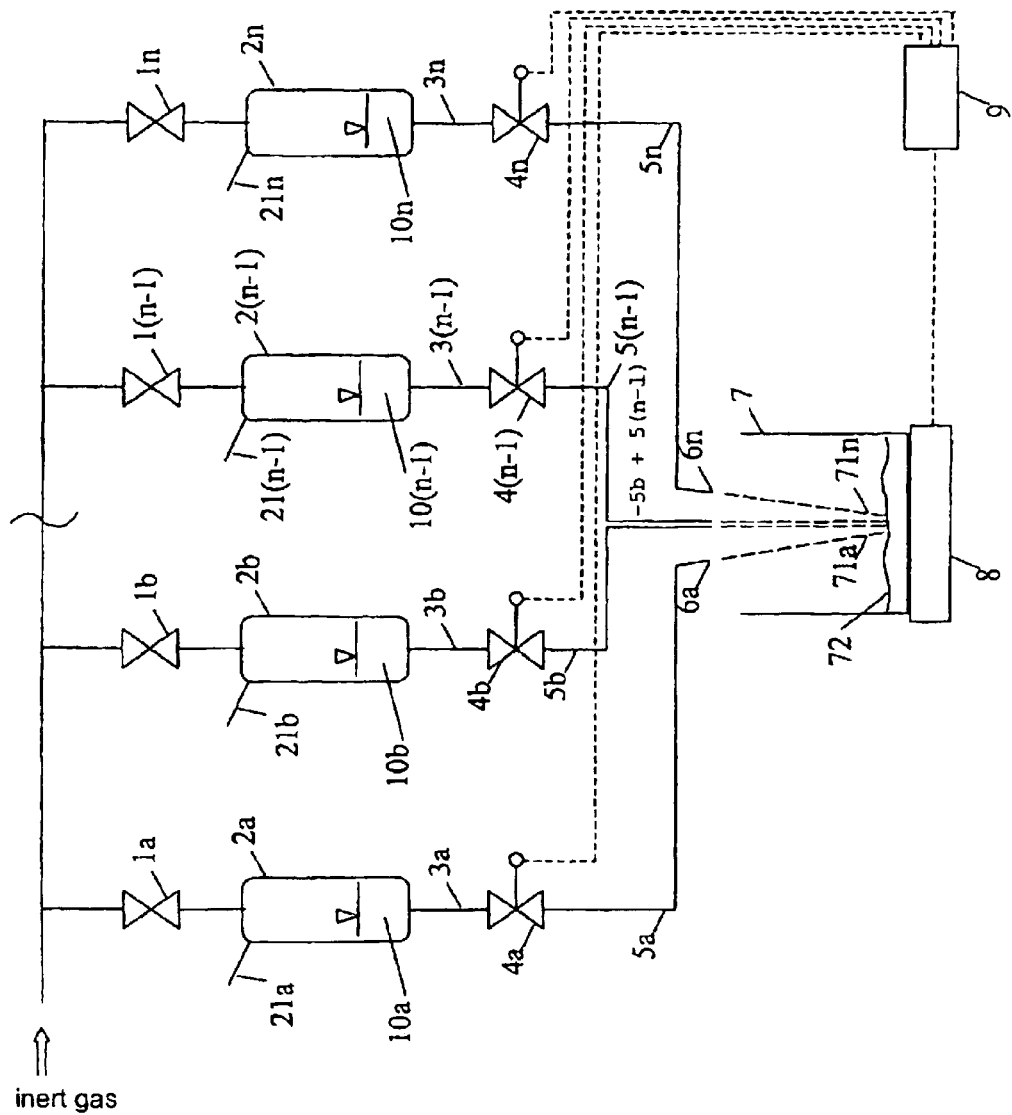

The present invention provides a process and an apparatus for dispensing at least two fluids. The apparatus may include: (a) two or more storage vessels for fluids, which may be pressurized with an individual, constant, inert gas pressure of up to 30 bar; (b) at least two switching fittings which exhibit switching times on the order of less than 100 ms, each having an inlet connected via a dispensing line to the outlet of a storage vessel; (c) a dispensing line between the outlet of each switching fitting; and (d) a reaction vessel into which the fluids are dispensed. The end of each dispensing line is directed towards the bottom of the reaction vessel. The dispensing apparatus also includes: (e) a balance to measure the weight of the contents of the reaction vessel and (f) a data acquisition and control device to acquire the measured data from the balance and to control the switching fittings.

Apparatus suitable for dispensing at least two fluids in accordance with the present invention may include: (a) one or more storage vessels for a fluid, which vessel(s) may be pressurized with an individual, constant, inert gas pressure of up to 30 bar; (b) at least one switching fitting which exhibits switching times of the order of less than 100 ms and has an inlet which is connected via a dispensing line to the outlet of the storage vessel; (c) a dispensing line between the outlet of the switching fitting; (d) a reaction vessel, into which the fluid is dispensed; (e) a balance to measure the weight of the fluid in the reaction vessel; and (f) a data acquisition and control device to acquire the measured data from the balance and to control the switching fittings. In the process of the present invention in which such apparatus is employed, at least one fluid is conveyed into the reaction vessel by the pressure gradient between the storage vessel and the reaction vessel and the fluid is dispensed by opening and closing the switching fitting. In a first sub-step, the fluid is dispensed until a quantity of from approximately 5 to 50 wt. % of the total mass of fluid to be dispensed is reached. The dispensed mass of the fluid is determined with the balance and, on the basis of the measured data for the dispensed mass, the actual mass flow rate of the fluid is calculated relative to the duration of opening of the switching fitting. In a second sub-step, the calculated mass flow rate from the first sub-step is used by the control device to calculate the duration of opening of the switching fitting for further dispensing of the fluid until the total mass of fluid to be dispensed is reached and the switching fitting is opened for the calculated duration of opening.

In the case of fast reacting systems it is possible and might be meaningful to use the predefined dispensing procedure for calibrating the instrument and make the real dosing with the sum of measured dosing times in one step in a further dosing procedure.

The present invention also provides a process for dispensing at least two fluids using an apparatus for dispensing at least two fluids which includes: (a) at least one storage vessel for a fluid, which vessel may be pressurized with an individual, constant, inert gas pressure of up to 30 bar; (b) at least one switching fitting which exhibits switching times on the order of less than 100 ms having an inlet connected via a dispensing line to the outlet of the storage vessel; (c) a dispensing line between the outlet of the switching fitting and a reaction vessel, into which the fluid is dispensed; (d) a balance to measure the weight of the fluid in the reaction vessel; and (e) a data acquisition and control device to acquire the measured data from the balance and to control the switching fittings. In this process, at least one fluid is conveyed into the reaction vessel by the pressure gradient between the storage vessel and the reaction vessel and the fluid is dispensed by opening and closing the switching fitting. In a first sub-step, the fluid is dispensed until a quantity of from approximately 5 to 50 wt. % of the total mass of fluid to be dispensed is reached. The dispensed mass of the fluid is determined with the balance and, on the basis of the measured data for the dispensed mass, the actual mass flow rate of the fluid is calculated relative to the duration of opening of the switching fitting. In the second sub-step, the calculated mass flow rate is used by the control device to calculate the duration of opening of the switching fitting for further dispensing of the fluid until 60 to 98 wt. % of the total mass of fluid to be dispensed is reached and the switching fitting is opened for the calculated duration of opening. The dispensed mass of fluid is determined with the balance and, on the basis of the measured data for the dispensed mass, the actual mass flow rate of the fluid is calculated relative to the duration of the opening of the switching fitting. In a third sub-step, the calculated mass flow rate is used by the control device to calculate the duration of opening of the switching fitting for further dispensing of the fluid until the total mass of fluid to be dispensed is reached and the switching fitting is opened for the calculated duration of opening.

In the case of fast reacting systems it is possible and might be meaningful to use the predefined dispensing procedure for calibrating the instrument and make the real dosing with the sum of measured dosing times in one step in a further dosing procedure.

In the practice of the present invention, it is, of course, possible that the same storage vessel may be used for two different fluids to be dispensed. In this embodiment of the invention, a first fluid is dispensed into the reaction vessel and after that first fluid has been completely dispensed, a second fluid may be fed to the same storage vessel that was used to dispense the first fluid. That second fluid may then be dispensed into the reaction vessel in two or more stages in accordance with the present invention.

Storage vessels useful in the practice of the present invention include any of the known vessels made, for example, from glass, plastics or stainless steel, which may be pressurized. The various storage vessels may be of differing sizes. Typical sizes are in the range of from 0.1 to 10 L, preferably in the range from 0.3 L to 1 L. Individual pressurization is preferably provided with an inert gas such as nitrogen or argon. In this connection, inert gas means a gas which does not dissolve to an appreciable extent in the components to be dispensed nor does it react therewith. The viscosity of the fluid to be dispensed essentially determines the selected level of pressure.

In the process of the present invention, the components are dispensed by setting a dispensing pressure in the range of from 0.1 to 30 bar, preferably in the range from 0.5 to 10 bar above atmospheric in the storage vessels. The fluids then flow, with declining pressure, through the dispensing lines, shut-off fitting and further optional components of the dispensing apparatus into the reaction vessel.

The dispensing lines used may be conventional lines made, for example, from stainless steel; dispensing lines made of plastics or glass may also be used. One preferred method of construction uses transparent or translucent plastic tubes. Typical diameters are in the range of from 1 mm to 10 mm. The diameters of the dispensing lines are preferably adapted to the viscosities of the components to be dispensed in such a manner that a larger diameter is used for dispensing higher viscosity components.

Conventional switching fittings suitable for use in the practice of the present invention include shut-off fittings such as gate valves, valves, cocks or other suitable switching fittings. The function of the switching fitting is to shut off or open the dispensing lines, such that, depending upon the position of the switching fitting, fluid flows or is prevented from flowing from the corresponding storage vessel into the reaction vessel into which the fluids are being dispensed.

The controllable switching fittings switch very rapidly and are preferably arranged as close as possible to the ends (outlet orifices) of the corresponding dispensing line. Switching times are generally on the order of less than 100 ms, preferably from 1 to 100 ms, more preferably from 5 to 100 ms, even more preferably from 7 to 50 ms, most preferably from 10 to 30 ms. "Switching time" as used herein means the time required for the mechanical switching operation to proceed. The distance of the switching fittings from the end (outlet orifice) of the corresponding dispensing line is preferably less than 20 cm, more preferably less than 10 cm, most preferably from 0.1 to 5 cm.

The switching fittings may, for example, be actuated pneumatically or hydraulically or by other means. Electrical-pneumatic or electrical-hydraulic transducers which suitably convert the control device's (e.g., computer's) electrical switching signal may be used.

In the reaction vessel, mixtures of the dispensed components are produced and the chemical reaction is conducted. Any desired vessel made, for example, from glass, plastics or stainless steel, may be used as the reaction vessel into which the fluids are dispensed. In one particular embodiment, the reaction vessel has a lid.

The dispensing lines from the switching fittings lead into the reaction vessel or up to the lid of the reaction vessel. The dispensing lines may pass through the lid and come to an end beneath the lid or they may end at the outer surface of a vessel lid having appropriate holes. In a preferred embodiment of the present invention, the fluids are dispensed into the open vessel and the vessel is closed after the reaction is complete.

When producing plastics in foamed form, the height of the reaction vessel should be dimensioned such that, even after the plastic has foamed, it cannot substantially rise above the vessel wall.

It is also advantageous if the ends (outlet orifices) of the dispensing lines end right above the inlet orifice of the reaction vessel. In this manner, spattering of the inner wall of the reaction vessel during dispensing is avoided and the component to be dispensed is completely dispensed onto the bottom of the reaction vessel. The component to be dispensed is prevented from coming into contact with the rim of the reaction vessel and optionally remaining on the rim or running down the outside of the wall of the reaction vessel. This is especially important when dispensing high viscosity components in a viscosity range of, for example, above 10 Pa·s. Typical values for the distance in a vertical direction from the ends of the dispensing lines to the orifice (upper edge) of the reaction vessel are approximately 2 mm to 20 mm and, in a horizontal direction from the inner wall of the reaction vessel to from about 5 mm to at most the internal radius of the reaction vessel.

The distance from the end of the dispensing line or a hole in the lid to the bottom of the reaction vessel or surface of the liquid in the reaction vessel is essentially determined by the height of the reaction vessel. Selection of the suitable reaction vessel is essentially determined by the components or reactive components to be dispensed. Beakers with a height of from 50 to 300 mm, more preferably from 100 to 200 mm are preferably used. This height may vary depending upon the quantity to be dispensed and the chemical reaction performed.

In one embodiment of the present invention, the lid of the reaction vessel is in the form of a perforated plate. In this embodiment, the dispensing lines open directly into the perforations or holes of the lid. In an alternative embodiment, the vessel lid takes the form of a positioning plate or positioning mount. The function of this plate or mount is to position the dispensing lines above the orifice of the reaction vessel in a manner such that, when dispensed, the components strike the bottom of the reaction vessel and not its wall. In both cases, the outlet orifices of the holes or dispensing lines are preferably arranged so that they are directed approximately towards the middle of the bottom of the reaction vessel. If a fluid is dispensed onto the rim or internal wall of the reaction vessel, there is a risk that if subsequent mixing is required, the components on the rim or inner wall will not be mixed in and it will not be possible to react them properly.

The ends of the dispensing lines or holes are preferably arranged in a manner such that the flowing fluids enter the reaction vessel in the narrowest possible jet, so that the increase in mass in the vessel can immediately be detected. The ends of the lines or holes may take the form of nozzles with a small flow cross-section of, for example, from 0.1 mm to 10 mm and be directed towards the bottom of the reaction vessel. In a particularly preferred embodiment, however, the ends of the dispensing lines or holes in the lid are simply the open ends of the dispensing lines.

The coupling of the balance, which detects the increase in weight in the reaction vessel, with the switching fittings by means of data acquisition, evaluation and control of the switching fittings, makes it possible to sequentially meter or dispense not only small quantities (e.g., 0.001 g) of material but also large quantities (e.g., 1000 g) of material.

The length and the internal diameter of the dispensing line located between each switching fitting and the lid of the reaction vessel must be such that the drain time of the component leaving the dispensing lines and the response time of the control means are adjusted to one another. The "drain time" as used herein means the time which is required to dispense the entire quantity of a component.

The response time of the control means (i.e. the time required to measure the weight with the balance, to acquire the data, to calculate the mass flow rate, to actuate the switching fitting and the switching time of the switching fitting) is preferably distinctly shorter than the drain time. The shorter response time of the control means ensures that the timing variations of these response times are also very small. Constant post-draining times and constant switching times are automatically detected and taken into account by the self-calibrating dispensing of the process according to the invention.

At a constantly set initial pressure, the dispensing error is always identical at an identical fluid level and is also taken into account by the self-calibrating dispensing of the process of the present invention. Allowance is also made in this manner for the different densities of the various components to be dispensed.

When performing the process of the present invention, it is important that the dispensing operation for at least one component be performed in at least two, preferably three, sub-steps.

The process in which the dispensing operation is performed in three sub-steps takes the following form. When the dispensing operation is performed in only two sub-steps, the second of the three sub-steps is omitted.

In the first sub-step, from 5 to 50%, preferably from 15 to 40%, most preferably from 25 to 35% of the total mass of the component to be dispensed is dispensed into the reaction vessel.

Once this component has been dispensed, the actually dispensed mass of the component is determined by weighing. On the basis of the measured data for the actually dispensed mass, the mass flow rate for this component under the prevailing conditions (initial dispensing pressure, temperature etc.), i.e. the mass of this component dispensed per unit time, is calculated. The flow rate is preferably calculated by control software.

In a second sub-step, the component is dispensed into the reaction vessel until from 60 to 98%, preferably from 80 to 95%, most preferably from 85 to 92% of the total mass of the component to be dispensed (determined on the basis of the mass flow rate calculated for that component in the first sub-step) is reached.

Control software calculates, on the basis of the mass flow rate value determined in the first sub-step, the time period required under the prevailing dispensing conditions to dispense the desired mass of the component. The control means opens the corresponding switching fitting to initiate the dispensing operation and then closes it again after the calculated time period.

Once the component has been dispensed, the actually dispensed mass of the component is determined with the balance and the mass flow rate determined in the first sub-step is verified and, in the event of any deviation, corrected.

In a third sub-step, the remaining 2 to 40%, preferably 5 to 20%, most preferably 8 to 15% of the total mass of the component to be dispensed is dispensed into the reaction vessel on the basis of the mass flow rate(s) verified or corrected in the second sub-step.

The control software calculates, on the basis of the mass flow rate value determined in the second sub-step, the time period required under the prevailing dispensing conditions to dispense the desired mass of a component. The control means opens the corresponding switching fitting to initiate the dispensing operation and then closes it again after the calculated time period has elapsed.

Each of the components to be dispensed is preferably dispensed in the three sub-steps. It is, however, also possible to initially introduce the total amount of one component into the reaction vessel, to determine the mass thereof and then to apportion additional components in the three sub-steps.

The components are preferably dispensed in a manner such that, for each component, all three sub-steps are performed directly one after the other. It is, however, also possible to perform each of the three sub-steps for all of the components one after the other and then to perform the next sub-step for all of the components. It is, however, vital that no dispensing sub-step proceed in parallel with another sub-step, otherwise the precise dispensed quantity of each component will not be known. It is an essential feature of the invention that the dispensed mass of at least one component in each sub-step is accurately detected and preferably also logged.

When dispensing is performed in two steps, the apparatus according to the invention and the process according to the invention allow automated, serial, gravimetric dispensing of, for example, up to 50 components in less than 12 min, preferably 20 components in less than 4 min, in a weight range of 0.010 g to 1000 g per component, if the components have a viscosity of from about 0.1 mPa·s to about 400 Pa·s (at 25° C.) and the individual dispensing error is at most 5%.

When dispensing is performed in three steps, the apparatus of the present invention and the process of the present invention allow automated, serial, gravimetric dispensing of, for example, up to 50 components in less than 15 minutes, preferably 20 components in less than 5 minutes, in a weight range of from 0.001 g to 1000 g per component, and at a viscosity of from 0.1 mPa·s to 400 Pa·s (at 25° C.) and the individual dispensing error is at most 2%. The apparatus is so compact that the entire unit may be set up on a laboratory bench with a conventional base area of 1 to 2 $m^2$. The process of the present invention may be performed with a high level of operational reliability.

A complete reaction batch has a volume of preferably less than 500 ml, more preferably of less than 100 ml and most preferably of from 1 to 20 ml.

Using the process according to the present invention, a reaction batch made up of 15 components may be dispensed or produced in a time of less than 3 to 5 minutes, such that a large number of reaction batches may be produced per day. Over the entire range of dispensing quantities and viscosities of the components, the dispensing error is less than 2%. As used herein, a "reaction" means a chemical reaction between the components or, alternatively, the production of a mixture of the components. An entire reaction may also proceed in various steps or stages, such that any intermediate products or already produced mixtures may be stored or homogenized.

For the purposes of the invention, a component may be an already pre-prepared mixture, a solution or a pure substance.

For homogenization or mixing, the filled or partially filled reaction vessel, optionally after removal of the lid, may be conveyed manually or automatically to a stirring element or the stirring element may be introduced into the reaction vessel. The components are then homogenized in the reaction vessel. This mixing may also be carried out on the balance.

In another embodiment of the present invention, a stirring element, (e.g., a homogenizing disk) may be placed in the reaction vessel. This embodiment is primarily advantageous for mixtures with a viscosity of less than 5000 mPa·s, preferably of less than 1000 mPa·s, most preferably of less than 500 mPa·s. The stirring element placed in the reaction vessel is preferably driven and set in rotation by an externally arranged, rotating magnetic field. This embodiment may be carried out both on the dispensing balance and separately from the dispensing balance.

Such a process and the associated apparatus may be used for dispensing the most varied of fluids in the stated viscosity range. Such applications include the production of physical mixtures of fragrances, dispensing of liquid foodstuffs and the production of colorant mixtures, for example from different inks. The process may also be used for the production of polyol formulations for polyurethane reactive foams in which a mixture of various hydroxyl compounds with auxiliaries (crosslinking agents, activators, stabilizers and blowing agents) is produced.

In another application, in which the components are subsequently caused to react chemically, the above-stated polyol formulations and diisocyanate compounds may be dispensed to produce polyurethane reaction foams. In this case, at least two components are dispensed into the reaction beaker, mixed and reacted.

The invention is illustrated in greater detail by way of example in the FIGURE which shows an apparatus according to the invention for dispensing fluids.

EXAMPLES

Example 1

Dispensing 5 Liquid Components for the Production of a Polyol Formulation

A polyol formulation was produced by dispensing: (1) a polypropoxy ether with a hydroxyl value of 460 mg of KOH/g, a functionality of 3 and an average molecular weight of 370 g/mol as polyol; (2) tris(1-chloro-2-propyl) phosphate as flame retardant; (3) polyethersiloxane Niax® SR242 from OSI Specialties Germany GmbH as stabilizer; (4) water; and (5) dimethylcyclohexylamine as catalyst into a reaction vessel having a volume of 500 ml.

Each of the components with its physical data (viscosity and density at 25° C., hydroxyl value in mg of KOH/g of substance (OH value)) is listed in Table 1.

Production proceeded in an apparatus of the type shown schematically in the FIGURE. The internal diameter of each of the dispensing lines 3a–3e and 5a–5e is listed in Table 1.

The polyol formulation was produced by initially introducing the 5 components 10a–10e into the storage vessels 2a–2e identified in Table 1 via the sealable feed lines 21a–21e and pressurized with helium as inert gas by opening valves 1a–1e. The pressures given in Table 1 were consequently established in the storage vessels 2a–2e.

The dispensing operation is described using the polyol as a representative of all of the components. 5810.0 mg of polyol were to be dispensed in three steps of 30%, 65% and 100% of the set quantity.

At the beginning of the dispensing operation, in the first sub-step, the control computer 9 opened the cock 4a. Due to the initial pressure of 7.0 bar prevailing in the storage vessel 2a, the polyol flowed, with declining pressure, through line 3a (diameter 4 mm), stopcock 4a and line 5a into the reaction vessel 7. The jet of the polyol from the end (outlet orifice) 6a of the dispensing line 5a to the bottom of the reaction vessel 7 is shown in the FIGURE by the dashed line 71a. After a time period, determined by precalibration, of 1798 ms, cock 4a was closed again, thereby interrupting the flow of the polyol into the reaction vessel 7. The balance 8 was used to determine the increase in weight in the reaction vessel 7 due to the dispensing of the polyol at 1720.8 g, which corresponds to 29.62% of the total mass of polyol to be dispensed. On the basis of the dispensing time and dispensed mass, the control computer 9 calculated the mass flow rate for the polyol as 1720 mg/1798 ms=0.9570634 g/s.

In order to continue dispensing, in the second sub-step, the control computer 9 opened the cock 4a again, such that polyol again flowed from the storage vessel 2a into the reaction vessel 7. The flow of polyol is again shown by the dashed line 71a in the FIGURE. The jet 71a in the reaction vessel 7 struck the liquid level 72 of the quantity of polyol already dispensed in the first sub-step. (The additional jets 71n indicated in the FIGURE do not occur during dispensing of the polyol, but merely indicate the jet of these components during the dispensing thereof.) After 2136 ms, the control computer 9 closed cock 4a again, thereby interrupting the flow of the polyol again. The balance 8 was used to determine the total weight of polyol dispensed from sub-steps 1 and 2 at 3768.1 g, which corresponds to 64.85% of the total mass of polyol to be dispensed. On the basis of the dispensing time and dispensed mass, the control computer 9 calculated the mass flow rate for the polyol as 3768.1 mg/(1720.8+2136) ms=0.9770016 g/s.

In the third sub-step, the control computer 9 opened the cock 4a again, so that polyol again flowed from the storage vessel 2a into the reaction vessel 7. After 2130 ms, the control computer 9 closed the cock 4a again, thereby interrupting the flow of the polyol again. The balance 8 was used to determine the total weight of polyol dispensed from sub-steps 1, 2 and 3 at 5805.1 g, which corresponds to 99.91% of the total mass of polyol to be dispensed.

Once the polyol had been dispensed, the remaining components were dispensed in analogous manner.

| Time | Action | % total mass |
|---|---|---|
| 00:00:24 | Dispense: polyol from cock 4a | |
| | Set quantity: 5810.0 mg | |
| 00:00:27 | Cock 4a open for 1789 ms | |
| 00:00:31 | Balance: 1720.8 mg | 29.62% |
| 00:00:33 | Cock 4a open for 2136 ms | |
| 00:00:37 | Balance: 3768.1 mg | 64.85% |
| 00:00:39 | Cock 4a open for 2130 ms | |
| 00:00:43 | Balance: 5805.1 mg | 99.91% |
| 00:00:44 | Dispense: flame retardant from cock 4b | |
| | Set quantity: 440.0 mg | |
| 00:00:45 | Cock 4b open for 237 ms | |
| 00:00:49 | Balance: 125.2 mg | 28.45% |

-continued

| Time | Action | % total mass |
|---|---|---|
| 00:00:49 | Cock 4b open for 298 ms | |
| 00:00:52 | Balance: 292.3 mg | 66.43% |
| 00:00:53 | Cock 4b open for 263 ms | |
| 00:00:56 | Balance: 439.7 mg | 99.93% |
| 00:00:57 | Dispense: stabilizer from cock 4c | |
| | Set quantity: 90.0 mg | |
| 00:00:58 | Cock 4c open for 147 ms | |
| 00:01:02 | Balance: 28 mg | 31.11% |
| 00:01:02 | Cock 4c open for 163 ms | 67.33% |
| 00:01:05 | Balance: 60.6 mg | |
| 00:01:05 | Cock 4c open for 147 ms | |
| 00:01:09 | Balance: 89.8 mg | 99.78% |
| 00:01:10 | Dispense: water from cock 4d | |
| | Set quantity: 120.0 mg | |
| 00:01:11 | Cock 4d open for 229 ms | |
| 00:01:14 | Balance: 35.3 mg | 29.42% |
| 00:01:15 | Cock 4d open for 275 ms | |
| 00:01:18 | Balance: 83.3 mg | |
| 00:01:18 | Cock 4d open for 210 ms | |
| 00:01:21 | Balance: 120.3 mg | 100.25% |
| 00:01:23 | Dispense: catalyst from cock 4e | |
| | Set quantity: 60.0 mg | |
| 00:01:24 | Cock 4e open for 246 ms | |
| 00:01:27 | Balance: 18.1 mg | 30.17% |
| 00:01:28 | Cock 4e open for 285 ms | 65.50% |
| 00:01:31 | Balance: 39.3 mg | |
| 00:01:31 | Cock 4e open for 278 ms | |
| 00:01:35 | Balance: 59.9 mg | 99.83% |

The dispensing error for the individual components was at most 0.25% relative to the desired value.

A) Example 2: Dispensing of Reactive Components

A polyurethane foam was produced by dispensing the polyol formulation produced in Example 1, cyclopentane as blowing agent and an isocyanate into the reaction vessel 7, in which the reaction to yield the polyurethane foam then proceeded.

All of the components with their physical data (viscosity and density at 25° C., hydroxyl value in mg of KOH/g of substance (OH value) or wt. % isocyanate groups (NCO)) are listed in Table 2.

Production proceeded in an apparatus of the type shown schematically in FIG. 1. The internal diameter of each of the dispensing lines 3f, 3g, and 5f and 5g is listed in Table 2.

The isocyanate used was diphenylmethane diisocyanate (MDI) with a content of 31 wt. % of NCO groups, 38 wt. % of 4,4'-, 2,4'- and 2,2'-isomers and a content of 62 wt. % of polynuclear MDI oligomers.

The two components, polyol formulation (10f) and isocyanate (10g), were initially introduced respectively into the storage vessels 2f and 2g (described in Table 2) via the sealable feed lines 21f and 21g and pressurized with helium as inert gas by opening valves 1f and 1g. The pressures listed in Table 2 were consequently established in the storage vessels 2f and 2g.

The polyol formulation was first dispensed into the reaction vessel in analogous manner to the dispensing of the polyol in Example 1.

| Time | Action | % total mass |
|---|---|---|
| 00:05:14 | Dispense: polyol formulation from cock 4f | |
| | Set quantity: 6520.0 mg | |

| Time | Action | % total mass |
|---|---|---|
| 00:15:55 | Dispense: isocyanate from cock 4g | |
| | Set quantity: 8870.0 mg | |
| 00:15:56 | Cock: 4g open for 213 ms | |
| 00:15:58 | Balance: 3628.6 mg | 40.91% |
| 00:15:58 | Cock: 4g open for 154 ms | |
| 00:16:01 | Balance: 6315 mg | 71.20% |
| 00:16:01 | Cock: 4g open for 146 ms | |
| 00:16:03 | Balance: 8872.5 mg | 100.03% |

After dispensing, the mixture was stirred manually with a wooden stick, wherein the foaming reaction to yield a rigid polyurethane foam was seen to begin.

The dispensing error was 0.09% and 0.03% respectively for the two substances, relative to the set value.

TABLE 1

Physical mixing

| Storage vessel | Substance | Viscosity [mPa·s] | Density [g/ml] | OH value | Pressure [bar] | Diam. line 3 and 5 [mm] | Dispensing operation [time] | Duration [s] | Set quantity [g] | Actual quantity [g] |
|---|---|---|---|---|---|---|---|---|---|---|
| 2a | Polyol | 7600 | 1.050 | 460 | 7.0 | 4 | 00:00:24 | 0:00:20 | 5.81 | 5.8051 |
| 2b | Flame retardant | 60 | 1.050 | 0 | 1.8 | 2 | 00:00:44 | 0:00:13 | 0.44 | 0.4397 |
| 2c | Stabilizer | 100 | 1.050 | 104 | 4.0 | 2 | 00:00:57 | 0:00:13 | 0.09 | 0.0898 |
| 2d | Water | 1 | 1.000 | 6228 | 3.0 | 0.25 | 00:01:10 | 0:00:13 | 0.12 | 0.1203 |
| 2e | Catalyst | 1.16 | 1.050 | 0 | 1.8 | 0.25 | 00:01:23 00:01:35 | 0:00:12 | 0.06 | 0.0599 |
| Total | | | | | | | | 0:01:11 | 6.52 | 6.5148 |

TABLE 2

Dispensing of reactive components

| Storage vessel | Substance | Viscosity [mPa·s] | Density [g/ml] | OH value or NCO | Pressure [bar] | Diam. line 3 and 5 [mm] | Dispensing operation [time] | Duration [s] | Set quantity [g] | Actual quantity [g] |
|---|---|---|---|---|---|---|---|---|---|---|
| 2f | Polyol formulation | 4100 | 1.050 | 490 | 6.0 | 4 | 00:05:14 00:05:34 | 0.00.20 | 6.52 | 6.5171 |
| | Blowing agent | | 0.630 | 72 | | | | | 0.61 | 0.61 |
| 2g | Isocyanate | 400 | 1.230 | 31 | 7.0 | 2 | 00:15:55 00:16:03 | 0:00:08 | 8.87 | 8.8725 |
| Total | | | | | | | | 0:00:28 | 16.00 | 15.9996 |

-continued

| Time | Action | % total mass |
|---|---|---|
| 00:05:17 | Cock: 4f open for 1972 ms | |
| 00:05:21 | Balance: 1985.3 mg | 30.45% |
| 00:05:23 | Cock: 4f open for 2674 ms | |
| 00:05:27 | Balance: 4688.5 mg | 71.91% |
| 00:05:29 | Cock: 4f open for 2477 ms | |
| 00:05:34 | Balance: 6514.1 mg | 99.91% |

0.61 g of cyclopentane were then added manually to the polyol formulation dispensed into the reaction vessel.

In the next step, the isocyanate was dispensed into the reaction vessel in analogous manner to the dispensing of the polyol in Example 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for dispensing at least two fluids comprising
   a) at least two storage vessels for fluids,
   b) at least two switching fittings which exhibit switching times on the order of less than 100 ms,
   c) a dispensing line at an outlet of each switching fitting which connects one of the switch fittings to an outlet of one of the storage vessels, d) a reaction vessel into which fluids from the storage vessels are dispensed, e) a second dispensing line at a second outlet of each switching fitting which connects one of the switch fittings and the reaction vessel in a manner such that fluid dispensed in the reaction vessel is directed towards the bottom of the reaction vessel, f) a balance to measure the weight of the contents of the reaction vessel, and g) a data acquisition and control device to acquire the measured data from the balance and to control the switching fittings.

2. The apparatus of claim 1 in which fluids present in at least two second dispensing lines e) are combined into a common dispensing line before being dispensed into the reaction vessel.

3. The apparatus of claim 1 in which one or more storage vessels are pressurized with inert gas to a pressure of up to 30 bar.

4. A process for dispensing at least two fluids using an apparatus comprising: a) at least one storage vessel for a fluid, b) at least one switching fitting which exhibits switching times on the order of less than 100 ms, c) a dispensing line which connects the storage vessel and an inlet of the switching fitting, d) a second dispensing line which connects an outlet of the switching fitting and e) a reaction vessel into which fluid is dispensed, f) a balance to measure the weight of the dispensed fluid in the reaction vessel, and g) a data acquisition and control device to acquire data from the balance and control the switching fitting, the process comprising the steps of (1) conveying at least one fluid into the reaction vessel using a pressure gradient between the storage vessel and the reaction vessel (2) dispensing the fluid into the reaction vessel by opening and closing the switching fitting in accordance with a procedure comprising
  (a) dispensing from about 5 to about 50 wt. % of the total fluid to be dispensed into the reaction vessel,
  (b) measuring the amount of fluid dispensed in (a) with the balance,
  (c) calculating the actual mass flow rate of the fluid from the amount of fluid measured in (b) relative to the duration of opening of the switching fitting,
  (d) calculating the duration of opening of the switching fitting using the mass flow rate calculated in (c) necessary to dispense the remaining portion of the fluid, and
  (e) opening the switching fitting for the duration of opening calculated in (d).

5. A process for dispensing at least two fluids using an apparatus comprising a) at least one storage vessel for a fluid which vessel may be pressurized with an individual, constant, inert gas pressure of up to 30 bar, b) at least one switching fitting which exhibits switching times on the order of less than 100 ms having an inlet connected via c) a dispensing line to an outlet of the storage vessel, d) a second dispensing line between the outlet of the switching fitting and a reaction vessel into which the fluid is dispensed and e) a reaction vessel, f) a balance to measure the weight of the fluid in the reaction vessel, and g) a data acquisition and control device to acquire measured data from the balance and to control the switching fittings the process comprising the steps of (1) conveying at least one fluid into the reaction vessel by pressure gradient between the storage vessel and the reaction vessel and (2) dispensing the fluid into the reaction vessel by opening and closing the switching fitting in accordance with a procedure comprising
  (a) dispensing from about 5 to about 50 wt. % of the total fluid to be dispensed into the reaction vessel,
  (b) measuring the amount of fluid dispensed in (a) with the balance,
  (c) calculating the actual mass flow rate on the basis of the measured data for the dispensed mass relative to the duration of opening of the switching fitting,
  (d) calculating from the mass flow rate calculated in the time period during which the switching fitting should be open in order to dispense the fluid in such an amount that from about 60 wt. % to about 98 wt. % of the total weight of the fluid to be dispensed into the reaction vessel is reached,
  (e) opening the switching fitting for the period of time calculated in (d) to dispense the fluid,
  (f) measuring the amount of fluid dispensed in (e) with the balance
  (g) calculating the actual mass flow rate of the dispensed fluid on the basis of the data measured in (f) for the dispensed mass relative to the duration of the opening of the switching fitting,
  (h) calculating the time period during which the switching fitting should be open to dispense the remaining portion of the fluid from the mass flow rate calculated in (g), and
  (i) opening the switching fitting for the period of time calculated in (h) to dispense the remaining portion of the fluid.

* * * * *